Feb. 11, 1941. A. A. KAHIL 2,231,388
FABRIC
Filed July 29, 1938 2 Sheets-Sheet 1

INVENTOR.
ABRAHAM A. KAHIL.
BY
Benj. T. Rauber ATTORNEY.

Feb. 11, 1941.  A. A. KAHIL  2,231,388
FABRIC
Filed July 29, 1938  2 Sheets-Sheet 2
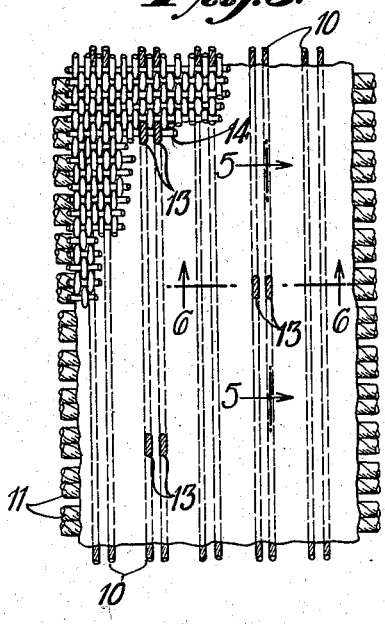
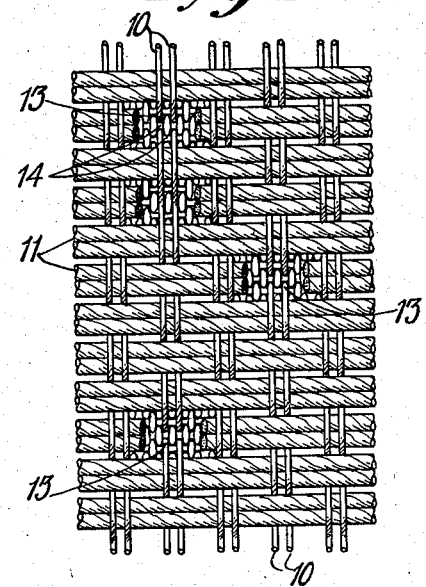
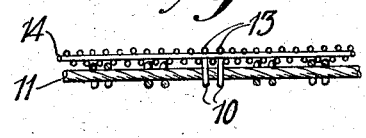
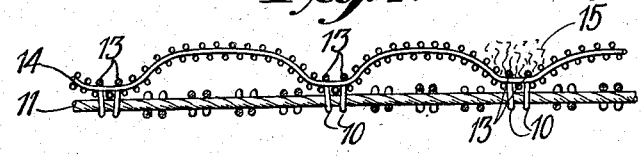
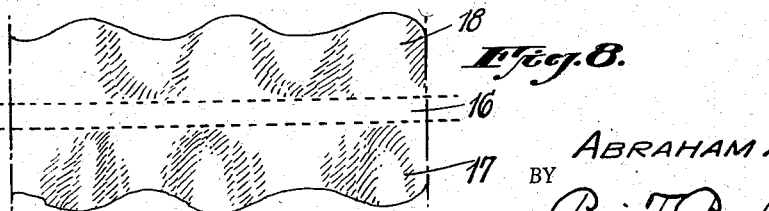
INVENTOR.
ABRAHAM A. KAHIL.
BY
Benj. T. Rauber ATTORNEY.

Patented Feb. 11, 1941

2,231,388

UNITED STATES PATENT OFFICE 2,231,388

FABRIC

Abraham A. Kahil, Ridgefield, N. J.

Application July 29, 1938, Serial No. 221,877

2 Claims. (Cl. 139—384)

My invention relates to fabrics, particularly to two-ply fabrics, one of which is shrunk and the other of which is joined or tied at intervals to the shrunk fabric so that it puckers during the process of shrinking.

Heretofore, fabrics of the above general type have been made by weaving two plies, one being provided with filling threads of wool, and the other of which is relatively non-shrinkable, such as cotton, rayon or silk, or mixtures thereof, and with some of the warp threads of the lower ply woven at intervals into and out of the non-shrinkable ply so as to tie the two plies together at spaced intervals.

To cause the unshrinkable ply to pucker, the entire fabric is immersed in water of a suitable temperature to cause the woolen filler threads of the shrinkable ply to shrink, thereupon the fabrics may be dried without tension. In the resulting fabric the shrunk ply may be stretched to its original dimensions, thus taking out the puckered effect of the unshrunk ply.

If properly prepared, upon releasing the tension the shrunk ply may, however, return approximately to its original shrunken condition. However, if tension be applied in any way to the shrunk fabric while still wet, or before it is dried and then dried while under tension, it remains in its stretched unshrunken condition after drying and the puckered effect on the unshrunk ply is substantially lost.

This manner of forming the puckered fabric, therefore, has the disadvantage that the shrunk ply may be stretched to remove the puckered effect even after it has been dried in the shrunken puckered state and also that it prevents tentering during drying as is common for rapid drying of fabrics, inasmuch as this would greatly remove the shrinkage and destroy the puckered effect.

In my present invention I provide a two-ply fabric, one ply being permanently shrunk so as to cause the puckering effect on the upper ply, and a method of forming two-ply puckered fabrics in which the shrunken ply is uniformly and permanently shrunk so that it does not stretch subsequently to its original dimensions and may be dried on the tentering machine without such stretching as would materially destroy the puckered effect.

In my present invention I weave two or more plies in known manner so as to cause certain threads, preferably warp threads, of the ply to be shrunk to interweave at intervals with the ply that is to be puckered. These intervals may have a random spacing so as to cause an irregular puckering of the ply to be puckered. Preferably, the warp and filling or weft threads of the ply to be shrunk are substantially of wool so that, upon shrinkage, the ply shrinks equally in both directions.

The multi-ply fabric thus woven is then fulled to impart a permanent shrinkage to the woolen ply. In this fulling the fabric is not only immersed in hot water, which may be somewhat alkaline, but is subjected to working while immersed. This working may be of any suitable kind, such as beating or agitating in such a manner as to cause a relative movement between the fibers of the woolen cloth. This manner of fulling has heretofore been known. Its effect is to cause the fibers to more firmly intermat and thus cause the fabric to shrink.

Due to the peculiar character of the woolen fibers, the effect of fulling in the above manner is to cause them to permanently mat into closer assembly so that they cannot be stretched to their original length even while wet. By having both the warp and weft threads of wool, or largely of wool, a uniform shrinkage in both directions is obtained. However, if it is desired to have certain zones of the fabric shrunk more than others so as to cause the fabric to bell out or ruffle on one or both sides of the zone, as for example, to form a collar piece, the wool in the zone to be contracted to the greatest extent is so selected as to shrink to the greatest extent on fulling. For this purpose, the zone to be contracted to the greater extent may be made thicker inasmuch as a thicker fabric fulls more rapidly, or the woolen fabric outside of the zone may be admixed with other fibers, such as silk, cotton or rayon, etc. to a greater extent than the zone given the greatest shrinkage.

After the fabric has been fulled and while still wet, it may be tautened on a tentering machine, or tentered in any suitable manner. Inasmuch as the shrunken ply has been permanently shrunk and does not stretch materially even while wet, the fabric may be passed through the usual tentering machine and dried therein without destroying the puckering which takes place during the fulling and shrinking of the shrunken ply. The result is a fabric having a fulled and permanently shrunk ply which does not stretch under normal conditions so as to destroy substantially the puckered effect of the other ply.

In weaving the two plies so as to tie them together at intervals a thread, generally the warp thread of the fabric to be shrunk, passes at intervals through the fabric to be puckered and back again. During the fulling the fibers of this thread may be raised to a nap which gives a fuzzy appearance between the puckered folds of the puckered layer. For certain purposes this fuzzy or downy appearance may be desirable; in case it is not, it may be removed by singeing the material so as to burn off the free or projecting fibers.

The various features of the invention are illustrated by way of example in the accompanying drawings, in which—

Fig. 3 is a plan or top of a part of the fabric taken on a large or exaggerated scale, the outline of the puckered fabric being shown and only partly filled in so as to show the relation between the two fabrics.

Fig. 4 is a similar view taken from the opposite side of the fabric with the areas being broken away to show the manner of tying the two fabrics together.

Figs. 5 and 6 are sections taken on the line 5—5, 6—6 of Fig. 3 of the fabric on an enlarged scale.

Fig. 7 is a section of the fabric similar to Fig. 6 after shrinking, and

Fig. 8 is a plan view on a greatly reduced scale of the fabric having certain zones shrunk more than others.

In the embodiment of the invention shown in the accompanying drawings, a shrinkable ply is shown as made of warp threads 10, and weft or filling threads 11, both of wool, and a relatively non-shrinking ply 12 of fibers, other than wool. It will be understood, of course, that although the warp and filler threads 10 and 11 are substantially of wool, they may contain small quantities of other fibers if desired, and that although the upper ply 12 is substantially non-woolen, it may contain a small amount of woolen fibers, if desired. The difference in the two plies is, however, that one will shrink by fulling, whereas the other will not, or not to the same extent.

Figure 1:
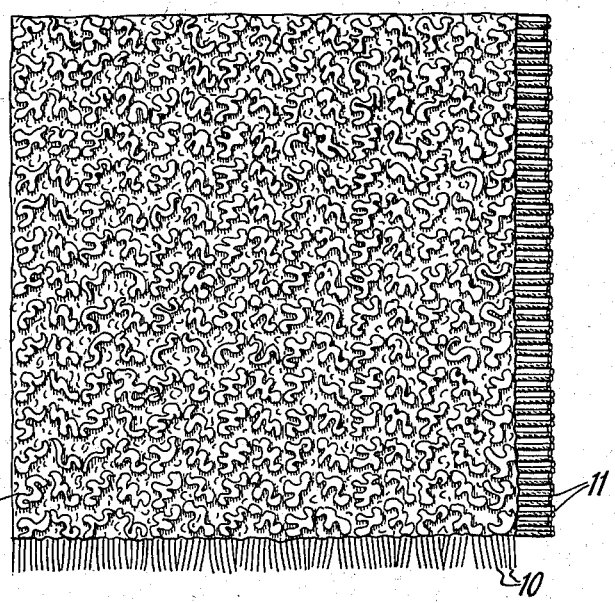
Fig. 1 is an upper or plan view of a fabric of my invention looking downwardly on the face of the fabric.
Figure 2:
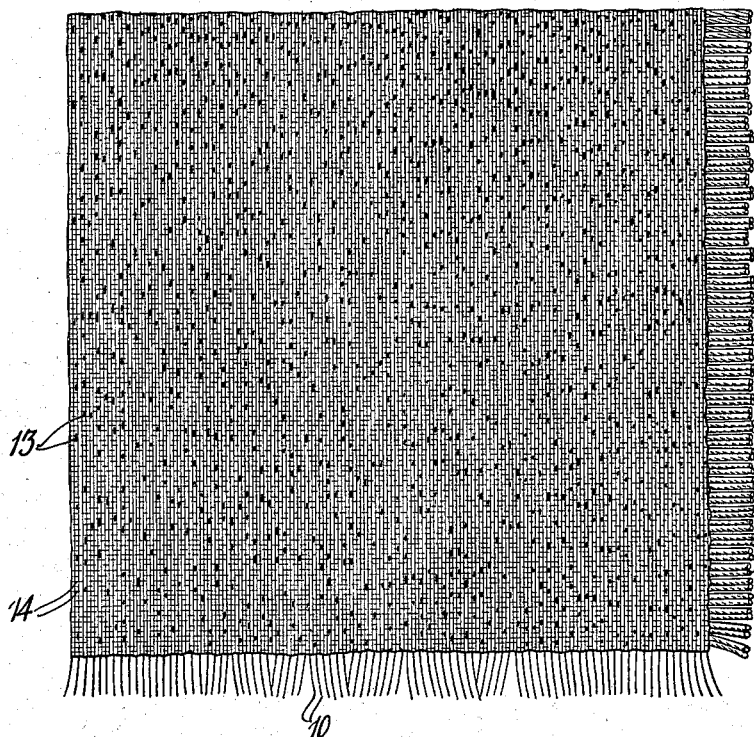
Fig. 2 is a similar view of the fabric before fulling and shrinking.

As indicated in Fig. 2, the two fabrics are joined at random intervals 13, as indicated by the darkened spots which represent the warp threads of the shrinkable ply passing through the opposite ply and thence back into the body of the shrinkable ply. This is shown more in detail in Figs. 3 and 4 in which it will be observed that the warp threads 10 of the shrinkable ply pass upwardly between weft or filler threads 14 of the non-shrinking fabric, thence over said threads and downwardly to the lower fabric. These threads are generally not readily distinguishable in the finished material as they are usually of the same color as the puckered ply.

The resulting structure is one in which the two plies are united only at certain intervals.

The fabric is now subjected to fulling as described above. The effect of this is to shorten the threads 10 and 11. Preferably the threads are both shortened uniformly, which gives a uniformly shrunk and uniformly puckered fabric.

Inasmuch as the distance between the two tying points shortens for the shrinkable ply, but remains unshortened for the other ply, the latter ply puckers as indicated in Fig. 7. If the fulling is continued for a long enough time a nap 15 is raised in the tying portions 13 of the threads 10, as indicated at the right-hand part of Fig. 7. If undesired this nap may be removed by singeing the fabric.

It is then necessary only to tenter and dry the fabric. In case it is desired to form a fabric having certain zones shorter than others so as to cause a ruffling effect at opposite sides of the zone, this may be accomplished by making the central zone, which is to be shortened the greatest amount, thicker or richer in wool whereupon it will shrink more in fulling and thus cause a ruffling effect at opposite sides of the zone.

For example, as shown in Fig. 8, a central zone 16 may be shrunk a greater amount than zones 17 and 18, causing a ruffling effect. This may be done where it is desired to form special pieces of material as, for example, collar pieces in which the zone 16 will be nearest the neck and the zone 17 or 18, or both, may flare outwardly therefrom.

In the above process any of the usual tentering and fulling apparatus may be employed. Fulling, for example, may be accomplished in a washing machine in which the working may be accomplished by oscillating movement of the tub or container, or by beating effects of bells or beating devices.

In the above description the shrinkable ply has generally been referred to as "woolen ply" and the puckered ply as "non-woolen." This will be understood in a relative sense and that both plies may be made partly of wool, provided one is more shrinkable than the other so that the latter will be puckered by the relatively greater shrinking of the other. For example, the ply to be puckered might be 20% or less wool, and the ply to be shrunk might be 50% or more wool.

The invention has been illustrated as specifically applied to the two-ply fabric. This is only by way of example, however, and it will be understood that the invention might be applied to a three-ply fabric with two plies to be puckered, for example, on opposite sides or faces of a ply to be shrunk.

What I claim is:

1. An integrally woven two-ply fabric consisting of separate plies united at intervals widely spaced relative to the meshes of said plies, one ply being permanently shrinkable by fulling, the other ply being closely woven and substantially non-shrinkable by fulling and the permanently shrinkable ply being fulled and substantially non-stretchable, the non-shrinkable ply being puckered within the points of interweaving of said ply.

2. The fabric of claim 1 in which said permanently shrinkable ply is predominantly of wool.

ABRAHAM A. KAHIL.